(12) United States Patent
Yamanaka et al.

(10) Patent No.: US 6,919,120 B2
(45) Date of Patent: Jul. 19, 2005

(54) PLASTIC MOLDING AND A METHOD AND A MOLD ASSEMBLY FOR PRODUCING THE SAME

(75) Inventors: Yasuo Yamanaka, Yokohama (JP); Jun Watanabe, Atsugi (JP); Kiyotaka Sawada, Atsugi (JP); Toshiharu Hatakeyama, Tokyo (JP); Hidenobu Kishi, Yamato (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 09/392,254

(22) Filed: Sep. 9, 1999

(65) Prior Publication Data

US 2002/0160152 A1 Oct. 31, 2002

(30) Foreign Application Priority Data

Sep. 11, 1998 (JP) .......................................... 10-258921
Oct. 14, 1998 (JP) .......................................... 10-292637

(51) Int. Cl.$^7$ ................................................ B29D 11/00
(52) U.S. Cl. ...................... 428/156; 428/157; 428/161; 428/162
(58) Field of Search ................................. 428/156, 157, 428/161, 162

(56) References Cited

U.S. PATENT DOCUMENTS

| 5,468,141 A | * 11/1995 | Iwami et al. ................ 425/542 |
| 5,603,871 A | 2/1997 | Koseko et al. |
| 6,287,504 B1 | * 9/2001 | Kanematsu et al. ........ 264/327 |

FOREIGN PATENT DOCUMENTS

| JP | 06-315961 | * 11/1994 |
| JP | 7-100877 | 4/1995 |
| JP | 8-127032 | 5/1996 |
| JP | 08-234005 | * 9/1996 |
| JP | 9-155928 | 6/1997 |
| JP | 10-278077 | * 10/1998 |

OTHER PUBLICATIONS

Machine translation of JP09–155928 (Attached to original japanese).*
U.S. Appl. No. 09/392,254, filed Sep. 9, 1999, Yamanaka et al.
U.S. Appl. No. 10/800,647, filed Mar. 16, 2004, Watanabe et al.
Patent Abstracts of Japan, Publication No. 11028745 A, Application No. 09164316, Feb. 2, 1999.
Patent Abstracts of Japan, Publication No. 06304973, Application No. 05101658, Nov. 1, 1994.
Patent Abstracts of Japan, Publication No. 2–175114, Application No. 63–334330, Jul. 6, 1990.

* cited by examiner

Primary Examiner—Kevin M. Bernatz
(74) Attorney, Agent, or Firm—Oblon, Spivak, McClelland, Maier & Neustadt, P.C.

(57) ABSTRACT

A plastic molding having high accuracy includes at least one transfer surface and at least one imperfect transfer portion having a concave or convex shape. The mold assembly includes a cavity into which molten resin is injected, a slide cavity piece which is capable of being slid at a prescribed time so that a gap is formed between the resin and the slide cavity piece, and a vent hole for supplying a compressed gas in the cavity. A method of producing the plastic molding includes the steps of heating resin to provide a molten resin, injecting the molten resin into a cavity of a molding, applying a resin-pressure to the molten resin, cooling the resin, sliding the slide cavity piece, and opening the mold assembly.

15 Claims, 7 Drawing Sheets

PLASTIC MOLDING AND A METHOD AND A MOLD ASSEMBLY FOR PRODUCING THE SAME

BACKGROUND OF THE INVENTION

1. Field of the Invention

The present invention relates to a plastic molding for use in, for example, an optical apparatus, such as a copier, a digital copier using a laser system, a laser printer, a facsimile machine, an optical apparatus for video camera, or an optical disk system, and a method and a mold assembly for producing the same. More particularly, the present invention relates to a plastic molding such as a plastic mirror or a plastic lens having a large and uneven thickness, and a method and a mold assembly for producing the same with high accuracy and low-cost.

2. Description of Related Art

An optical element such as a lens or a mirror is used in an optical unit of an optical apparatus, such as a copier, a printer, a facsimile machine, and so forth. In recent years, with the increase of demand for reducing costs of products, the base material of such an optical element has generally shifted from glass to plastics. Further, an optical element having a complicated aspheric surface is frequently formed for achieving multi-functions with a reduced number of optical elements. Such an optical element is generally designed to have a thick and uneven thickness distribution.

Such an optical element can be produced with low-cost and high mass-productivity using a method by which molten resin is injected into a cavity of a mold assembly or another method by which base-resin is inserted into a cavity of a mold assembly, even when producing a peculiar configuration.

For example, an injection molding method and a compression injection molding method are known. According to the known injection molding method, molten resin is injected into a cavity having a prescribed volume in a mold assembly that is controlled to have a temperature lower than a softening point of the resin. Then, the molten resin is cooled to solidify under a controlled pressure thereof. The solidified resin, or the resulting molding, is taken out by opening the mold assembly.

Generally, in the solidification process by cooling the molten resin in the cavity, a temperature or a pressure of the resin in the cavity is preferably intended to be uniform, in order to produce a plastic molding having a desired shape with high accuracy.

However, in producing a plastic molding such as a lens, the plastic molding is deteriorated due to differences of the amount of shrinkage within the volume being molded, which is caused by differences of cooling rates of the resin due to the uneven thickness. For example, as illustrated in FIG. 12, in producing a plastic lens 3 having a thick and uneven thickness, the plastic lens 3 actually formed may be caused to sink in a sinking portion. An exemplary view of such a sinking portion is illustrated in FIG. 13. Namely, in FIG. 13, a sinking portion 151 extends widely and reaches not only a side surface (non-transfer surface) 121 but also an optical surface (transfer surface) 111.

In order to overcome such problems related to sinking, a pressure of injected molten resin may be increased. In this case, the amount of the molten resin is thereby increased. However, the inward deformation of the plastic molding is also caused to increase. In particular, when the plastic molding is thick, optical properties thereof are deteriorated due to the large inward deformation of the thin portion.

According to the compression injection molding method, a transfer piece, which provides a portion of a cavity wall, is configured so as to be capable of moving inside a mold assembly. The transfer piece is advanced so as to follow the shrinkage of resin filled up in the cavity during a cooling process of the resin. For example, in producing a lens having an uneven thickness, each portion has a difference in amount of the shrinkage due to the uneven thickness in the longitudinal direction thereof. The transfer piece is advances in compliance with the shrinkage so as to apply a constant pressure to the resin. Therefore, the reduction of pressure during the cooling process is compensated according to the compression injection molding method.

Accordingly, the molten resin can be injected under a lower injection pressure than that of the above-mentioned injection molding method. However, the transfer piece is not always able to follow the shrinkage of resin due to uneven shrinkage that depends on thickness distribution of the molding. Therefore, portions of some moldings are still caused to sink.

From this point of view, other studies have been performed to overcome shortcomings of the injection molding method and the compression injection molding method. For example, according to a method disclosed in the Japanese Laid-Open Patent Publication No. 2-175115 or No. 6-304973, a molding is configured so as to sink in a surface other than a transfer surface of a mold assembly. The mold assembly includes a vent hole provided in a surface other than the transfer surface (mirror surface) so that a differential pressure between the transfer surface and a portion near the vent hole is generated. The differential pressure causes the molding to sink only at the portion near the vent hole, thereby preventing the molding from sinking in the mirror surface.

However, because the prescribed sinking in the surface other than the transfer surface does not occur widely, such a prevention of the sinking in the transfer surface, which is achieved by causing the molding to sink in the surface other than the transfer surface, is confined to a portion near the vent hole. Accordingly, the molding may be caused to sink in a portion far from the vent hole.

Further, still another background mold assembly is disclosed in the Japanese Laid-Open Patent Publication No. 11-28745, which includes a slide cavity piece providing a surface of a cavity other than the transfer surface. A gap is forcibly formed between the slide cavity piece and resin injected into the cavity when the slide cavity piece is slid in a direction away from the resin. Therefore, sinking in the transfer surface is prevented and inward deformation is reduced to a low level.

However, in producing a large molding having high accuracy, it is required to intentionally cause the molding to sink in a large area. Therefore the area of the cavity piece which is brought into contact with the resin is required to be large. In this case, contact-force between the cavity piece and the resin becomes large, which deforms the molding when the cavity piece is forcibly separated from the resin.

Therefore, in producing an uneven, large, or peculiar molding by the above-mentioned methods, a thick portion neighboring the transfer surface may be caused to sink due to differences of the cooling rates. Further, an inward pressure or distortion remains in a thin portion of the molding. Accordingly, the accuracy of the shape is deteriorated. In particular, the accuracy of optical properties may be deteriorated due to an increase of the birefringence of the plastics.

SUMMARY OF THE INVENTION

Accordingly, the present invention has been made in view of the above-discussed problems and an object of the present invention is to address these and other problems.

Another object of the present invention is to provide a novel plastic molding having high accuracy of a transfer surface.

Yet another object of the present invention is to provide a novel plastic molding having a large and uneven thickness.

Still another object of the present invention is to provide a novel plastic molding [with] made at low-cost.

Still another object of the present invention is to provide a novel method for producing a plastic molding having high accuracy.

Still another object of the present invention is to provide a novel method for producing a plastic molding with low-cost and high mass-productivity.

Still another object of the present invention is to provide a novel mold assembly for producing a plastic molding having high accuracy.

According to an embodiment of the present invention, a method of producing a plastic molding includes a step of heating a mold assembly which includes at least one transfer surface, at least one slide cavity piece providing a surface other than the transfer surface, and at least one vent hole for supplying a compressed gas. The mold assembly is heated to a prescribed mold-temperature lower than a softening point of a resin. The slide cavity piece and the transfer surface are arranged to form at least one cavity. Further, the resin is heated to a prescribed resin-temperature above the softening point thereof to melt the resin. Then, the molten resin is injected into the cavity so that the cavity is filled with the molten resin. Further, a resin-pressure is applied to the molten resin so that the molten resin is brought into tight contact with the transfer surface. Then the resin is cooled to a temperature lower than the softening point, so that the molten resin is solidified.

At a prescribed time during a period of time when the resin is cooled, the slide cavity piece is slid in a direction away from the resin, due to supply of the compressed gas via the vent hole so that a gap is forcibly formed between the resin and the slide cavity piece. Then, the mold assembly is opened so that the plastic molding may be taken out from the mold assembly.

The resin-pressure at the time when the slide cavity piece is slid may be equal to or less than 60 MPa (mega-pascal). Further, the compressed gas may have a gas-pressure in a range of from 0.1 to 2 MPa.

According to another embodiment of the present invention, a mold assembly for producing a plastic molding includes a cavity having a prescribed volume, at least one transfer surface, and at least one non-transfer surface other than the transfer surface. The mold assembly further includes a slide cavity piece capable of being slid and a vent hole for supplying a compressed gas into the cavity.

The slide cavity piece provides a surface which corresponds to the non-transfer surface.

Molten resin heated to a temperature higher than a softening point thereof is injected into the cavity under a resin-pressure applied to the molten resin so that the transfer surface is transfer to the molten resin. Further, the slide cavity piece is slid in a direction away from the resin in the cavity at a time during a period of time when the resin-pressure is decreased to a prescribed pressure, so that a gap is forcibly formed between the resin and the slide cavity piece.

The vent hole may be disposed in the slide cavity piece. Alternatively, the vent hole may be disposed between the slide cavity piece and a portion of the mold assembly adjacent to the slide cavity piece.

The mold assembly may further include a pressure control device for pressing the slide cavity piece in a controlled state. The pressure control device is capable of pressing the slide cavity piece so that the resin-pressure is controlled to be equal to or higher than a prescribed pressure.

The pressure control device may include a driving mechanism including an oil cylinder or an electric motor. The driving mechanism can slide the slide cavity piece.

The mold assembly may further include a pressure detector for detecting the resin-pressure in the cavity and a sliding mechanism for sliding the slide cavity piece. The sliding mechanism slides the slide cavity piece on the basis of detected information from the pressure detector.

A surface of the slide cavity piece that contacts the resin may be processed with a surface treatment using a low adhesive material which has a low adhesive force with the resin.

A step may be formed in a joint surface between the transfer surface and the slide cavity piece. According to yet another embodiment of the present invention, a plastic molding includes at least one transfer surface and at least one imperfect transfer portion. The transfer surface is formed by applying a resin-pressure to resin in a cavity of a mold assembly having at least one transfer surface. The imperfect transfer portion is formed by imperfectly transferring a shape of the cavity of the mold assembly so as to have the concave or convex shape. The imperfect transfer portion is located in at least one prescribed portion of the plastic molding so as to release a residual resin-pressure and inner deformation. The imperfect transfer portion may be formed in a portion other than the transfer surface.

Further, the imperfect transfer portion may be formed in an extension-surface of the transfer surface.

The imperfect transfer portion may be formed so as to have a contour located along an edge of the transfer surface.

The plastic molding may further include a second transfer surface. In this case, the imperfect transfer portion may be formed in a portion between the transfer surface and the second transfer surface so as to have a contour located along both edges of the transfer surface and the second transfer surface.

The imperfect transfer portion may be formed in a thin portion of the plastic molding.

According to still another embodiment of the present invention, a method of producing a plastic molding including at least one transfer surface and at least one imperfect transfer portion is provided.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
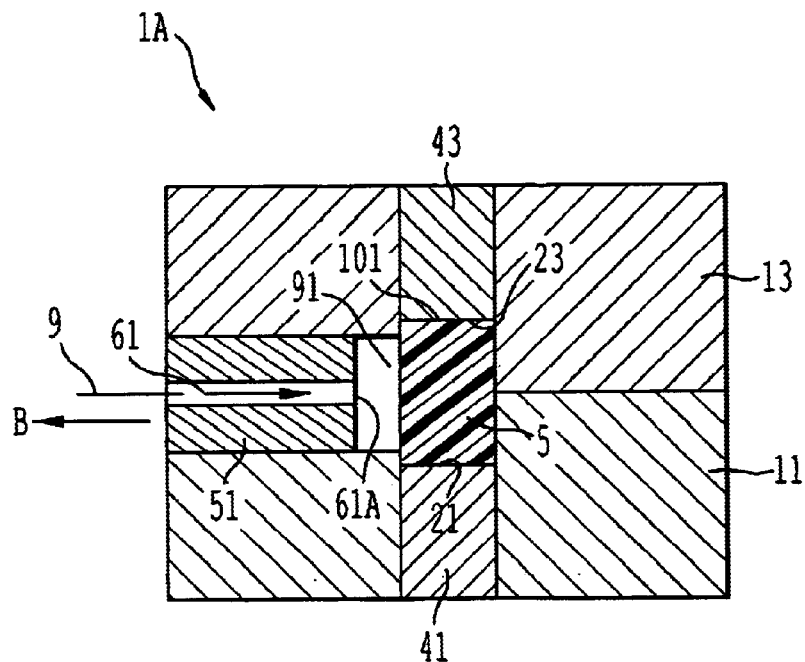
FIG. 1 is a sectional view illustrating a mold assembly according to an embodiment of the present invention, wherein the mold assembly is operated in one mode of operation.

Referring now to the drawings, wherein like reference numerals designate identical or corresponding parts throughout the several views, preferred embodiments of the present invention are now explained.

FIG. 1 illustrates a mold assembly according to an embodiment of the present invention. The mold assembly 1A includes a lower mold 11, an upper mold 13, a first cavity piece 41 providing a first transfer surface 21, a second cavity piece 43 providing a second transfer surface 23, and a slide cavity piece 51. A cavity 101, into which molten resin 5 is injected, is formed by the lower mold 11, the upper mold 13, the first and the second cavity pieces 41 and 43, and the slide cavity piece 51. The slide cavity piece 51 provides a non-transfer surface. A gas-communication path 61 having a vent hole 61A at the front edge thereof is provided in the center of the slide cavity piece 51.

Next, a method of producing a plastic molding using the mold assembly 1A is explained. After the mold assembly 1A is heated to a temperature lower than a softening point of the resin, the molten resin, which is heated to a temperature higher than the softening point, is injected into the cavity 101. Then, a resin-pressure is applied to the molten resin 5 so that the molten resin 5 in the cavity 101 is brought into tight contact with the first and the second transfer surfaces 21 and 23. At a prescribed time during the cooling of the molten resin 5 to a temperature lower than the softening point, the slide cavity piece 51 is slid so as to move in a direction B away from the resin 5 due to the supply of a compressed gas 9. The compressed gas 9 is introduced into the cavity 101 filled with the resin 5 via the gas-communication path 61 provided in the slide cavity piece 51.

Therefore, a gap 91 between the slide cavity piece 51 and the molten resin 5 is forcibly formed. Then, the resin 5 is further cooled to have a temperature lower than the softening point. The thus produced molding is taken out by opening the mold assembly.

The compressed gas is, for example, nitrogen, argon, air, or a mixture thereof. In this case, the gas is easily handled because it is not dangerous. Also, other kinds of gas may be employed.

The gas-communication path 61 is designed to have an appropriate dimension, for example, a diameter in a range of from 0.02 to 0.03 mm (millimeter). When the diameter of the gas-communication path 61 is excessively large, the molten resin injected into the cavity enters the gas-communication path 61 from the vent hole 61A. When the diameter of the gas-communication path 61 is too small, the compressed gas 9 cannot be supplied smoothly.

In the method of producing a plastic molding according to the present invention, when the plastic molding is formed under a low resin-pressure so as to be caused to sink, the compressed gas 9 provided via the vent hole 61A penetrates between the resin 5 and the slide cavity piece 51. Therefore, the slide cavity piece 51 is easily separated from the resin 5 to form the gap 91. Once the gap 91 is formed between the slide cavity piece 51 and the resin 5 by sliding the slide cavity piece 51, contact-force (restraining force) of the resin with the slide cavity piece 51 vanishes. Accordingly, a force of shrinkage due to cooling of the resin selectively acts mainly on the surface the resin that is separated from the slide cavity piece 51.

Figure 2:
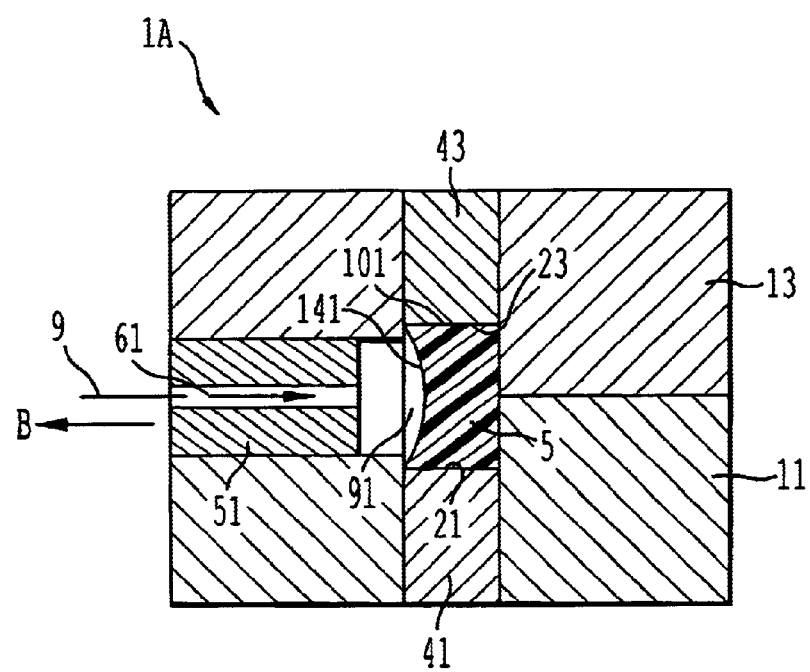
FIG. 2 is a sectional view illustrating the mold assembly of FIG. 1, wherein the mold assembly is operated in another mode of operation.

In addition, because the gas is filled in the gap 91, the cooling rate of the cavity surface contacting the gas becomes smaller than that of the other surfaces. Therefore, as shown in FIG. 2, a curved surface 141 of the plastic molding may be intentionally formed by sliding the slide cavity piece 51 in a controlled state so as to have concave or convex shape.

Accordingly, the accuracy of the transfer surface of the plastic molding can be improved. In particular, an optical element such as a lens that has high accuracy and little residual deformation can be produced because the pressure of the molten resin injected into the mold assembly can be reduced to a low level.

The gap 91 is formed between the resin 5 and the slide cavity piece 51 by sliding the slide cavity piece at a time during a period of time when the pressure of the molten resin decreases to a prescribed pressure equal to or less than 60 MPa (mega-pascal). Further, when the compressed gas has a pressure in a range of from 0.1 to 2 MPa, the cavity piece 51 can be easily separated from the resin 5.

Figure 3:
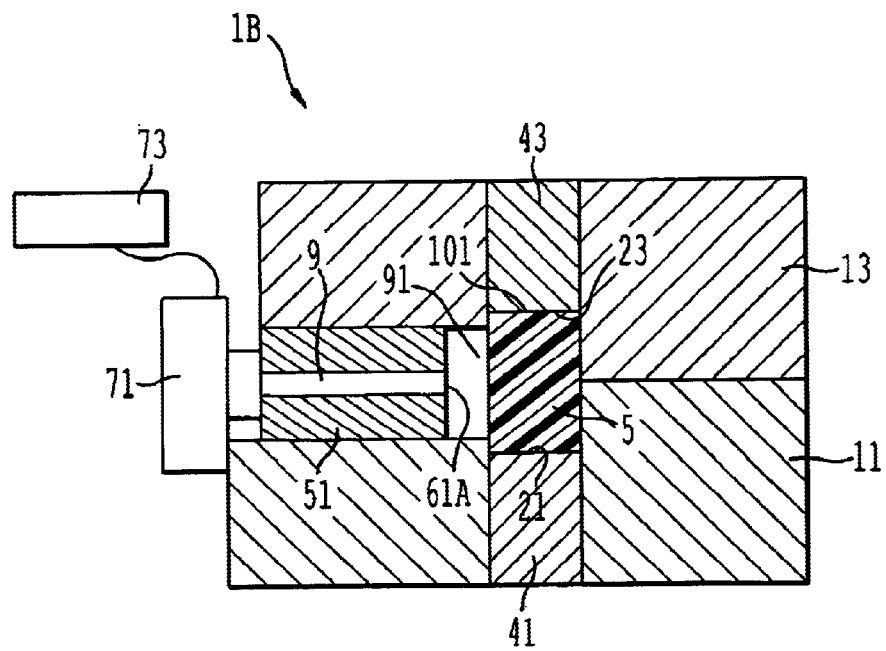
FIG. 3 is a sectional view illustrating a mold assembly according to another embodiment of the present invention.

FIG. 3 illustrates a mold assembly according to another embodiment of the present invention. In addition to the mold assembly of FIG. 1, the mold assembly 1B further includes a pressure control device 73 and an oil pressure cylinder 71 for applying pressure to the slide cavity piece 51. The pressure control device 73 controls the oil pressure cylinder 71 to provide a driving force of the slide cavity piece so that the pressure of the resin in the cavity can be kept higher than a prescribed pressure. While the oil pressure cylinder 71 has been illustrated schematically, it should be understood that it does not block the gas communication path 61.

Further, the oil pressure cylinder 71 may apply a force to the slide cavity piece 51 so that the slide cavity piece 51 is fixed or not moved by an initial resin-pressure when the molten resin is injected into the cavity.

As an alternative to the oil pressure cylinder 71, another driving member such as an electric motor may be used for sliding the slide cavity piece.

Figure 4:
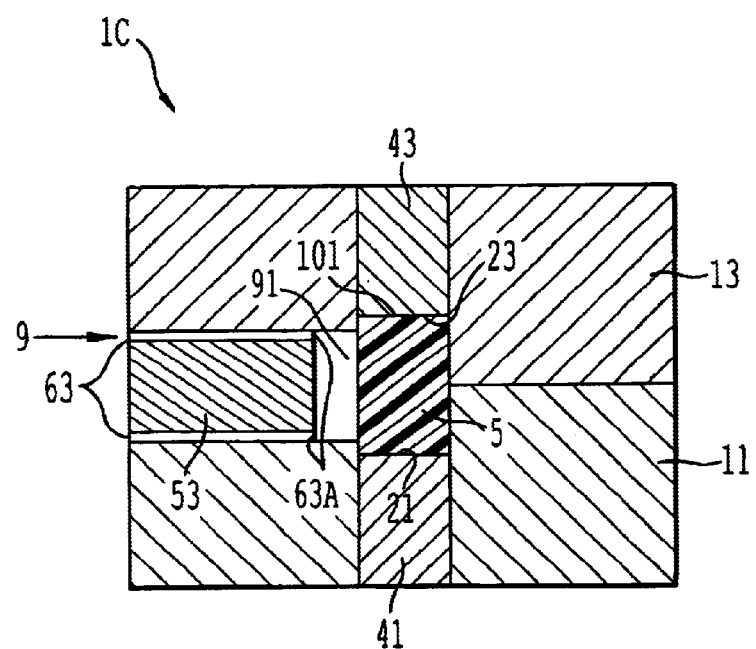
FIG. 4 is a sectional view illustrating a mold assembly according to yet another embodiment of the present invention.

FIG. 4 illustrates a mold assembly according to yet another embodiment of the present invention. In the molding assembly 1C, a plurality of grooves for forming a plurality of gas-communication paths 63 are formed in side surfaces of a slide cavity piece 53. The plurality of grooves may be arranged symmetrically. The front edges of the plurality of groves correspond to a plurality of vent holes 63A of the gas-communication paths 63. The depth of each groove is, for example, in a range of from 0.02 to 0.03 mm (millimeter). A compressed gas 9 is introduced via the vent holes 63A so as to fill a gap 91, where the slide cavity piece 53 is moved in a backward direction. The structure having the plurality of grooves is suitable for a small slide cavity piece in which the gas-communication path 61 of FIG. 1 cannot easily be provided therein. In contrast, the plurality of grooves are easily formed on the side surface of the slide cavity piece.

In this embodiment, the depth and width of each groove are designed similarly to the embodiment of FIG. 1. In particular, the depth and width corresponding to the above-mentioned diameter in the range of from 0.02 to 0.03 mm are preferred.

Figure 5:
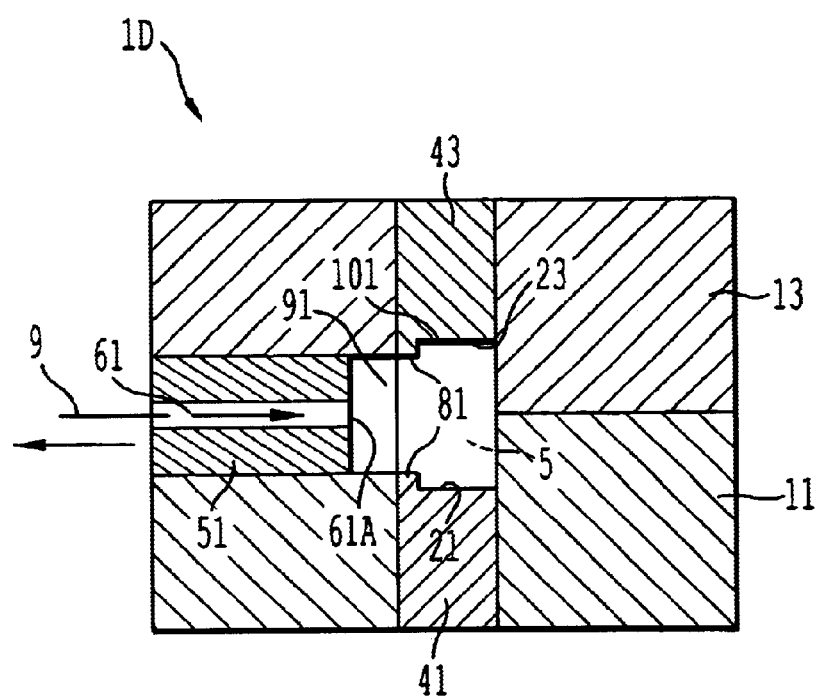
FIG. 5 is a sectional view illustrating a mold assembly according to still another embodiment of the present invention.

In producing a plastic molding with required accuracy of the transfer surface, if the compressed gas reaches the transfer surface of the mold assembly, the transfer surface of the resulting molding is deteriorated in accuracy. FIG. 5 illustrates a mold assembly according to still another embodiment of the present invention, which is provided from this point of view. In the mold assembly 1D, a step 81 is formed in a vicinity of a transfer surface 23 so that a compressed gas 9 introduced into a gap 91 does not reach a transfer surface 23 beyond the step 81. The height or width of the step 81 is not less than 0.3 mm, although preferred height or width depends on the pressure of the compressed gas 9. In particular, when the pressure of the compressed gas 9 is in a range of from 0.1 to 2 MPa, the height or width in a range of from 0.5 to 1 mm is preferred.

The mold assembly according to the above-explained embodiments may further include a pressure detector for detecting a resin-pressure in the cavity. The slide cavity piece may be slid on the basis of information on a detected resin-pressure generated by the pressure-detector.

In the mold assembly as explained above, the surface of the mold assembly for forming the cavity may be processed with a surface treatment for reducing a contact-force between the surface and the resin. A material having low adhesive force with the resin is used, for example, TiN (titanium nitride), TiCN (titanium cyanide), W2C (tungsten carbide), DLC (diamond-like carbon), WC/C (tungsten carbide/carbon composite), and Teflon (polytetrafluoroethelyne) resin.

When the contact-force is large, for example, when resin having high adhesive power is employed, the strong contact-force may deform the resulting plastic molding. In this case, it becomes difficult to separate the slide cavity piece from the resin. Therefore, the contact-force is preferably reduced.

Further, because the TiN, the TiCN, or the W2C provides high wear and abrasion resistance, such a material having high wear and abrasion resistance may be employed for a surface for sliding the slide cavity piece, in order to improve durability of the mold assembly.

Next, a plastic molding according to still another embodiment of the present invention is explained with reference to FIGS. 6, 7A, and 7B.

Figure 6:
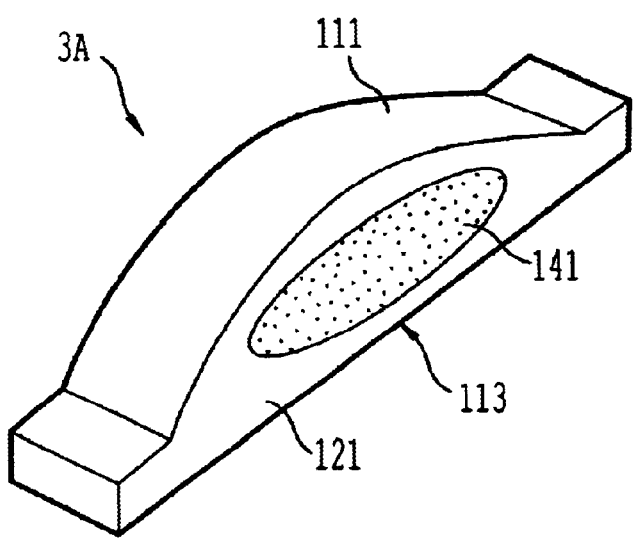
FIG. 6 is an oblique view illustrating a plastic lens according to still another embodiment of the present invention.

As illustrated in FIG. 6, a plastic lens 3A (optical element) includes a first optical surface[s] 111 (a first transfer surface 111) and a second optical surface 113 (a second transfer surface 113) and a side surface 121 between the first optical surface 111 and the second optical surface 113. The first optical surface 111 is curved so that a center of the plastic lens 3A becomes thick. The second optical surface 113 is a flat surface and is disposed opposite the first optical surface 111. Namely, the plastic lens 3A is formed to have an uneven shape. Further, the plastic lens 3A includes an imperfect transfer portion 141 which is formed according to a method so as to have a concave or convex shape in the side surface 121. In this embodiment, the imperfect transfer portion 141 is formed, for example, using a mold assembly 1E as illustrated in FIGS. 7A and 7B.

Alternatively, the plastic lens 3A (the plastic molding according to the present invention) may be formed by another method of various types other than the injection molding method, for example, a compression molding method, a blow molding method, and so forth. However, the injection molding method is preferred because solidification of molten resin then begins at a surface thereof first, whereas the interior thereof is still in a molten state.

Therefore, as described later, it is easy to form an imperfect transfer portion at any position by separating the resin from the wall of the cavity. Thereby inward deformation of the lens 3A is reduced and the first and the second transfer surfaces can be formed with high accuracy. Accordingly, a plastic molding having a large and uneven thickness can be efficiently produced. From this point of view, the injection molding method is preferred. Specifically, the method of producing a plastic molding according to the present invention is further preferred.

Figure 7A:
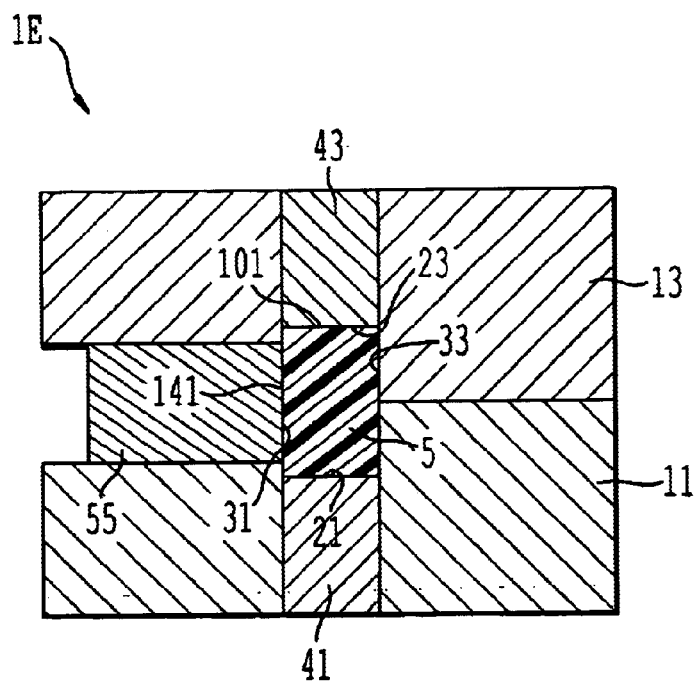
FIG. 7A illustrates a background mold assembly which may be employed in producing the plastic lens of FIG. 6, wherein a slide cavity piece before being slid is illustrated.
Figure 7B:
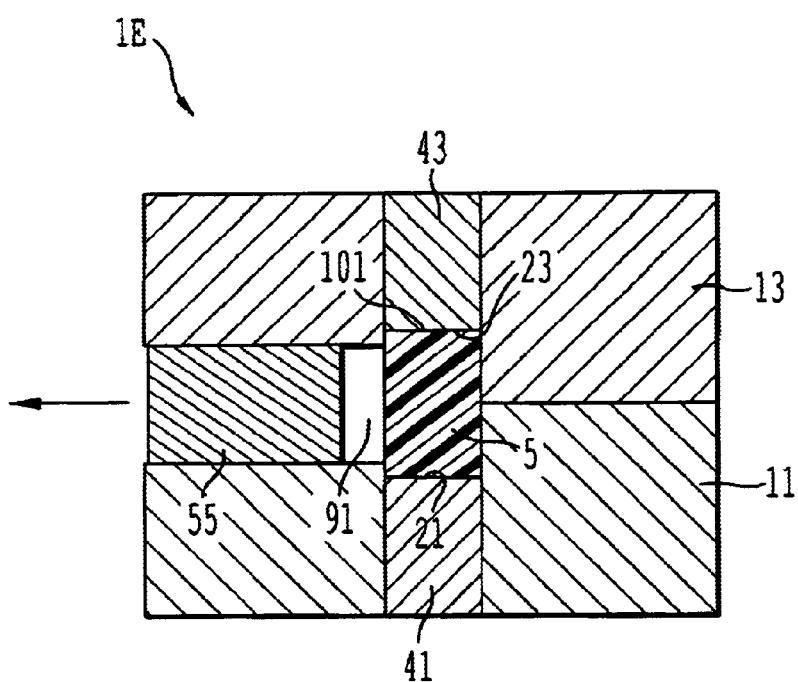
FIG. 7B illustrates the mold assembly of FIG. 7A, wherein the slide cavity piece after being slid is illustrated.

As shown in FIG. 7A, the mold assembly 1E includes, for example, a lower mold 11 and an upper mold 13 for forming a cavity 101 configured to be opened and closed. The mold assembly 1E further includes a first cavity piece 41 having a first transfer surface 21, a second cavity piece 43 having a second transfer surface 23. A first side wall 31 and a second side wall 33 are also provided in the mold assembly. The cavity 101 is formed by the first transfer surface 21, the second transfer surface 23, the first side wall 31, and the second side wall 33. Molten resin 5 is injected into the cavity 101. In the recess of the first side wall 31, a slide cavity piece 55 is provided so as to be capable of being slid forward/backward, or toward/away from the cavity 101. The slide cavity piece 55 has a contour corresponding to that of the imperfect transfer portion 141.

The mold assembly 1E is controlled manually or automatically so as to be opened and closed. Further, the slide cavity piece 55 is controlled manually or automatically so as to be slid, when the plastic lens 3A is formed by the injection molding method. As shown in FIG. 7A, as in the ordinary injection molding method, molten resin 5 is injected into the cavity 101. Then, the molten resin 5 is cooled to be solidified. With the progress of the solidification of the molten resin 5, a resin-pressure of the resin 5 decreases. When the resin-pressure of the resin 5 decreases to a prescribed pressure, the slide cavity piece 55 is slid in a backward direction away from the resin 5 in the cavity 101, as shown in FIG. 7B by a means which is not shown. Thus, a gap 91 between the slide cavity piece 55 and the resin 5 is generated according to the method of the present invention.

Thus, the molten resin 5 injected into the cavity 101 of the mold assembly 1E is cooled and solidified, contacting closely to the first and the second transfer surfaces 21 and 23, and the first and the second side walls 31 and 33 of the cavity 101, due to the resin-pressure. When the slide cavity piece is separated from the resin, the [separated portion] free surface of the resin is deformed according to the resin-pressure. If the resin-pressure remains at this time, the free surface of the resin 5 becomes convex to release the pressure, and assumes a shape similar to that of a side wall of the slide cavity piece 55.

If the resin-pressure is lower than the atmospheric pressure, the free surface of the resin 5 becomes concave due to the local shrinkage for separation, and assumes a shape similar to the side wall of the slide cavity piece 55. In any case, the imperfect transfer portion 141 is formed on the plastic lens 3A.

The surface of the resin 5 as separated from the wall of the slide cavity piece 55 is a free surface which can be easily deformed. Further, because heat more slowly escapes from the slide cavity piece 55, the free surface becomes hotter than other portions which contact the walls of the cavity 101. Therefore, the free surface is further deformed due to the shrinkage of the resin 5 so as to be concave, that is, to cancel the convex shape of the free surface. Therefore, even if the free surface just after the separation becomes convex, the final shape of the free surface is not always convex. In particular, because the injection-pressure of the molten resin 5 into the cavity 101 is required to be small so that the residual inward deformation does not deteriorate the optical properties of the lens 3A, a concave portion due to the shrinkage by cooling, or a sinking portion, is predominantly generated in the separated portion when the molding is formed under low injection pressure.

According to the injection molding method using the mold assembly 1E, in which the imperfect transfer portion 141 is formed to be convex or concave according to the resin-pressure at the side wall of the slide cavity piece 55, the plastic lens 3A having a required accuracy of a first optical surface 111 and a second optical surface 113 can be produced without residual inward resin-pressure or deformation.

Further, when the imperfect transfer portion 141 is formed on the side surface other than the first and the second optical surfaces 111 and 113, the optical surfaces can be formed with high accuracy. In addition, as shown in FIG. 7A, the first side wall 31 is disposed between the slide cavity piece 55 and the first transfer surface 21. Therefore, the first optical surface 111 is not directly brought into contact with the periphery of the imperfect transfer portion 141. In other words, the imperfect transfer portion 141 does not reach the first transfer surface 111. Accordingly, the plastic lens 3A can be formed with low deformation and high accuracy.

As to the resin for forming the plastic lens 3A, when transparency thereof is required, amorphous resin whose softening point is the glass-transition temperature thereof, for example, polymethylmethacrylate, polycarbonate, cycloaliphatic acrylic resin, cyclic polyolefine copolymer (for example, Geonex made by Nippon Geon), and so forth may be used. Alternatively, for moldings other than optical elements, crystalline resin whose softening point is the melting point thereof may also be used.

As described above, according to the embodiment of the present invention, the plastic lens 3A having the imperfect transfer portion 141 can be produced by the injection molding method suitable for mass production. The injection molding method can produce moldings having a large and uneven thickness at a low-cost comparable to that of the moldings having a small thickness. The resulting plastic lens 3A has excellent accuracy in shape, optical properties, and so forth, and has little residual inward resin-pressure or deformation, which is achieved by the formation of the imperfect transfer portion 141.

Figure 8:
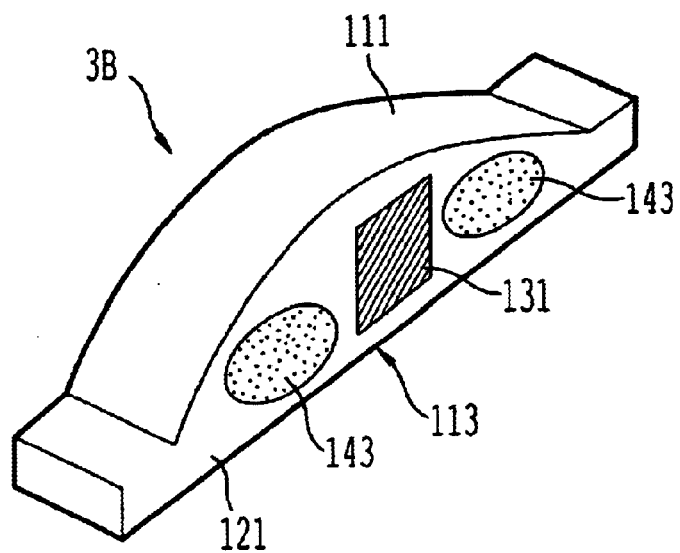
FIG. 8 is an oblique view illustrating a plastic lens according to still another embodiment of the present invention.

FIG. 8 is an oblique view illustrating a plastic molding according to still another embodiment of the present invention.

In FIG. 8, the plastic lens 3B includes a first optical surface 111, a second optical surface 113, and a side surface 121. A reference surface (transfer surface) 131 for setting the lens is formed on the longitudinal center of the side surface 121. Further, a pair of imperfect transfer portions 143 having a concave or convex shape are formed on respective thin portions near both sides of the reference surface 131.

The plastic lens 3B is formed by an injection molding method using a mold assembly having a structure similar to the mold assembly 1E of FIG. 7A. In addition to the mold assembly 1E of FIG. 7A, the mold assembly for producing the plastic lens 3B further includes a third cavity piece which provides a transfer surface for forming the reference surface 131. The third cavity piece is disposed in a recess of a side wall corresponding to the first side wall 31 of FIG. 7A. Further, the single slide cavity piece of FIG. 7A is replaced by a pair of slide cavity pieces for forming the pair of imperfect transfer portions. The pair of slide cavity pieces are identical to slide piece 55, but are disposed in respective corresponding positions for forming the pair of imperfect transfer portions 143.

The reference surface 131 is formed when molten resin injected in the cavity of the mold assembly is brought into tight contact with the transfer surface of the third cavity piece. In addition, the pair of slide cavity pieces are slid at a prescribed time during a period of time when a surface of the molten resin is cooled to be solidified. Thereby a gap and the pair of imperfect transfer portions are formed, accompanied by either a local release of resin-pressure or a local shrinkage for separation. When the local release of pressure according to the resin-pressure takes place, the shape of the pair of imperfect transfer portions 143 generally become convex. Alternatively, when the local shrinkage for separation according to the resin-pressure takes place, the shape of the pair of imperfect transfer portions 143 become concave.

Accordingly, the reference surface 131 for setting the plastic lens 3B, as well as the first optical surface 111 and the second optical surface 113, can be formed with high accuracy in shape. Further, by disposing the reference surface 131 in the same side surface as the pair of imperfect transfer portions 143, accuracy of the setting is surely obtained. This is in contrast to the background injection molding method in which a surface including a reference surface may be caused to totally sink. The deformed surface cannot provide sufficient accuracy as the reference surface.

The formation of the pair of imperfect transfer portions 143 reduces the inward resin-pressure and the distortion, as a whole. In addition, because the pair of imperfect transfer portions 143 are disposed in respective thin portions of the plastic lens 3B, the inward resin-pressure and the distortion of the thin portion are locally prevented. Further, because total area of the pair of imperfect transfer portions 143 can be designed to be large, the depth or height of the concave or convex imperfect transfer portion becomes small enough so that the pair of imperfect transfer portions do not negatively affect the transmitting region for the light.

As described-above, the plastic lens 3B having a reference surface in a side surface thereof can be produced with high accuracy and reduced inward pressure or deformation of the thin portion thereof. Namely, the accuracy of optical surfaces as well as that of the reference surface is improved, thereby optical properties thereof is further improved.

Figure 9:
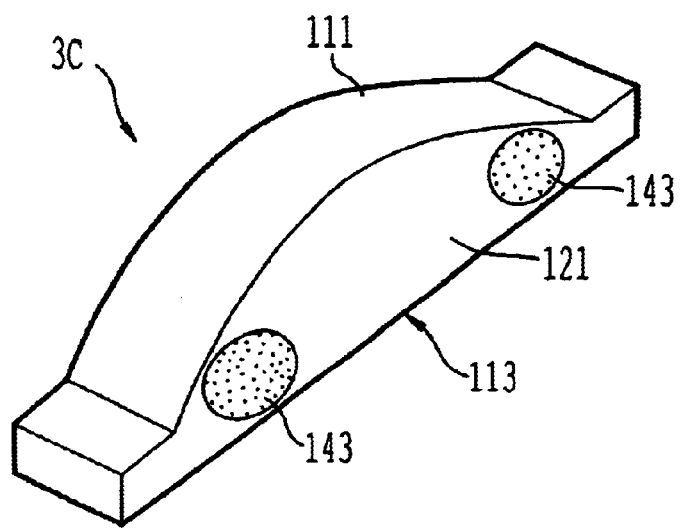
FIG. 9 is an oblique view illustrating a plastic lens according to still another embodiment of the present invention.

FIG. 9 illustrates a plastic lens 3C according to still another embodiment of the present invention. The plastic lens of this embodiment lacks the reference surface 131.

Figure 10:
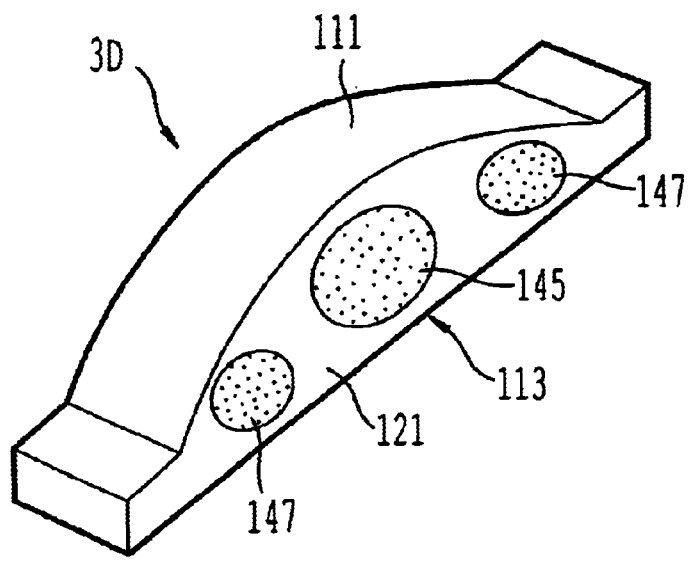
FIG. 10 is an oblique view illustrating a plastic lens according to still another embodiment of the present invention.

FIG. 10 is an oblique view illustrating a plastic lens 3D according to still another embodiment of the present invention. In FIG. 10, the plastic lens 3D includes a first optical surface 111 and a second optical surfaces 113, a side surface 121, a first imperfect transfer portion 145, and a pair of second imperfect transfer portions 147. The first imperfect transfer portion 145, which replaces the imperfect transfer portion 141 of FIG. 6, is formed so as to have a large circular contour. Further, the pair of second imperfect transfer portions 147 having respective circular contours are respectively formed in thin portions beside both sides of the first imperfect transfer portion 145. The first imperfect transfer portion 145 and the pair of second imperfect transfer portions 147 are formed to have a concave or convex surface.

The plastic lens 3D can be formed by an injection molding method using a mold assembly. In addition to the mold assembly 1E of FIG. 7A, the mold assembly includes a pair of the slide cavity pieces to produce the second imperfect transfer portions 147. Further, the slide cavity piece of FIG. 7A is replaced by a first slide cavity piece having a contour corresponding to that of the first imperfect transfer portion 145.

In the method of producing the plastic lens 3D, the first slide cavity piece and the pair of second slide cavity pieces, which are disposed in a recess of a side wall corresponding to the side wall 31 of FIG. 7A, are slid at a prescribed time during a cooling process of molten resin so that respective gaps are formed. The first imperfect transfer portion 145 and the pair of second imperfect transfer portions 147 are formed to have either respective concave surfaces due to the local shrinkage for separation or convex surfaces due to local release of the resin-pressure.

Because the first imperfect transfer portion 145 and the pair of second imperfect transfer portions 147 can be designed to have a sufficient total area such that the depths or heights thereof are small, the optical properties of the transmitting portion for light are not negatively affected by the first imperfect transfer portion 145 and the pair of second imperfect transfer portions 147. In addition, the first imperfect transfer portion 145 and the pair of second imperfect transfer portions 147 suppress a residual resin-pressure or inward deformation of the plastic lens, as a whole. In addition, the imperfect transfer portion 145 can locally suppress the resin stress or inward deformation of the thin portion of the plastic lens 3D.

Although the circular contour of the imperfect transfer portion of the above embodiments is advantageous for easily processing the mold assembly, the contour of the imperfect transfer portion is not restricted to the above-explained embodiments.

In general, when total area of the imperfect transfer portion or portions is large, the inward resin-pressure or deformation is further released, so that the optical accuracy is further improved. From this point of view, the plastic lens 3D may further include additional imperfect transfer portions.

Figure 11:
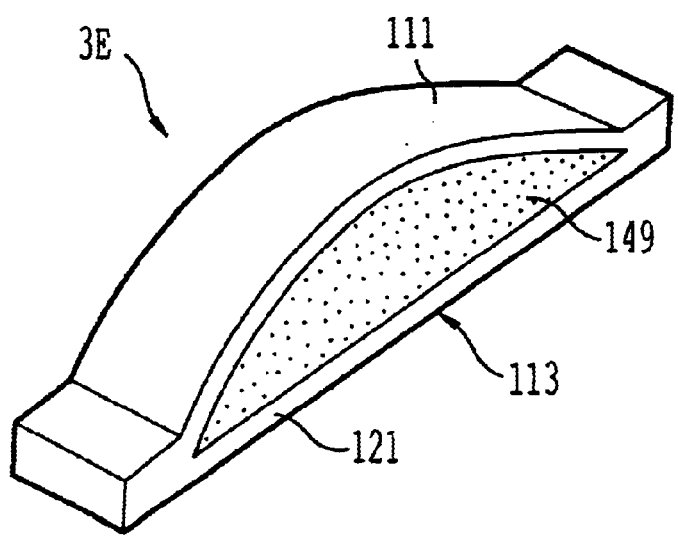
FIG. 11 is an oblique view illustrating a plastic lens according to still another embodiment of the present invention.
Figure 12:
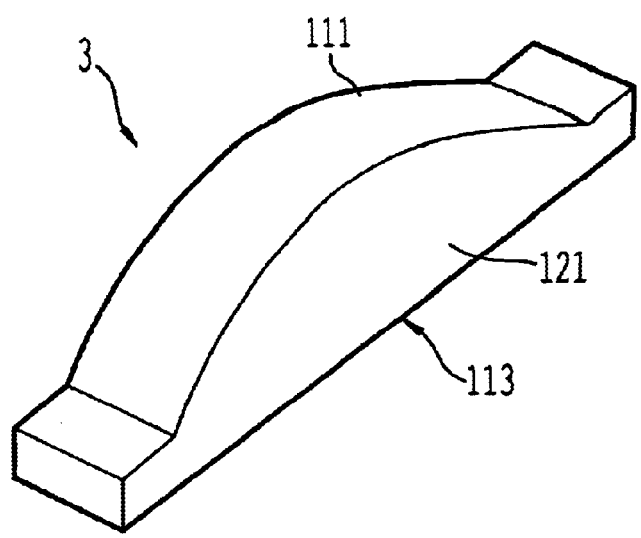
FIG. 12 is an oblique view illustrating a background plastic lens.
Figure 13:
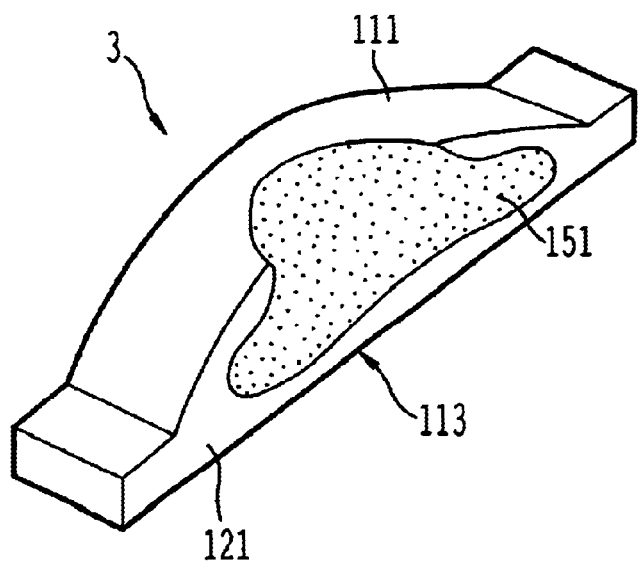
FIG. 13 is an oblique view for explaining problems of the background plastic lens of FIG. 12.

FIG. 11 is an oblique view illustrating a plastic molding according to still another embodiment of the present invention. The plastic molding is formed by the method of the present invention as explained above. In FIG. 11, the plastic lens 3E includes a first optical surface 111, a second optical surface 113, a side surface 121, and an imperfect transfer portion 149 formed in the side surface 121 between the first optical surface 111 and the second optical surface 113. The contour of the imperfect transfer portion 149 is formed along respective edges of the first optical surface 111 and the second optical surface 113, so that the area of the imperfect transfer portion 149 is large.

Accordingly, height or depth of the imperfect transfer portion 149 can be small enough so that the light transmitting portion is not negatively influenced. Further, the inward resin-pressure or deformation can be further released. Therefore, the optical accuracy is further improved.

In producing a large plastic molding according to the present invention, an imperfect transfer portion may be formed for each mirror surface so that the imperfect transfer portion is disposed along the contour of the mirror surface. Each imperfect transfer portion is designed to have an area such that the resin stress or inward deformation] is prevented efficiently. Accordingly, a large molding can be produced. Further, the large molding can be formed to have uniform optical properties with respect to longitudinal direction thereof.

Obviously, numerous modifications and variations of the embodiments disclosed herein are possible in light of the above teachings. It is therefore to be understood that within the scope the appended claims, the invention may be practiced otherwise than as specifically described herein.

This document is based on Japanese Patent Application Nos. 10-258921 filed in the Japanese Patent Office on Sep. 11, 199 and 10-292637 filed in the Japanese Patent Office on Oct. 14, 1998, the entire contents of which are hereby incorporated by reference.

What is claimed is:

1. A plastic molding comprising:
    at least one transfer surface, the transfer surface being an optical surface; and
    a plurality of imperfect transfer portions each having a concave or convex shape,
    wherein at least one of the imperfect transfer portions is located in at least one prescribed portion of the plastic molding so as to release a residual resin-pressure and an inward deformation of the plastic molding,
    wherein all of the plurality of imperfect transfer portions are formed so as to have a contour disposed apart from an edge of the transfer surface,
    wherein a reference portion for setting the plastic molding is provided on a side surface adjacent to the at least one transfer surface, and
    wherein two imperfect transfer portions of the plurality of imperfect transfer portions are provided on the same side surface as the reference portion.

2. The plastic molding according to claim 1, wherein at least one of the plurality of imperfect transfer portions is formed in a portion having a thickness less than a maximum thickness of the plastic molding.

3. The plastic molding according to claim 1, wherein the plastic molding is an optical element.

4. The plastic molding according to claim 1, further comprising a second transfer surface provided opposite to the at least one transfer surface, wherein the at least one transfer surface is curved, and wherein the second transfer surface is flat.

5. The plastic molding according to claim 1, wherein the plastic molding has a non-uniform thickness along a length thereof.

6. The plastic molding according to claim 1, wherein at least one of the plurality of imperfect transfer portions has a convex shape.

7. A plastic molding comprising:
- a transfer surface;
- at least one imperfect transfer portion having a concave or convex shape, wherein the imperfect transfer portion is located in at least one prescribed portion of the plastic molding so as to release a residual resin-pressure and an inward deformation of the plastic molding, the imperfect transfer portion is formed in a portion other than the transfer surface, and the imperfect transfer portion is formed so as to have a contour disposed apart from an edge of the transfer surface; and
- a second transfer surface, wherein the imperfect transfer portion is formed in a portion between the transfer surface and the second transfer surface so as to have a contour disposed apart from edges of both the transfer surface and the second transfer surface,
- wherein a reference portion for setting the plastic molding is provided on a side surface adjacent to the transfer surface, and
- wherein two imperfect transfer portions are provided on the same side surface as the reference portion.

8. The plastic molding according to claim 7, wherein the second transfer surface is provided opposite to the transfer surface, wherein the transfer surface is curved, and wherein the second transfer surface is flat.

9. The plastic molding according to claim 7, wherein the plastic molding has a non-uniform thickness along a length thereof.

10. The plastic molding according to claim 7, wherein the at least one imperfect transfer portion has a convex shape.

11. The plastic molding according to claim 7, wherein the two imperfect transfer portions each have a convex shape.

12. The plastic molding according to claim 7, wherein the two imperfect transfer portions each have a concave shape.

13. A plastic molding comprising:
- at least one transfer surface, the transfer surface being an optical surface; and
- a plurality of imperfect transfer portions each having a concave or convex shape,
- wherein at least one of the imperfect transfer portions is located in at least one prescribed portion of the plastic molding so as to release a residual resin-pressure and an inward deformation of the plastic molding,
- wherein at least one of the plurality of imperfect transfer portions is formed so as to have a contour disposed apart from an edge of the transfer surface,
- wherein a reference portion for setting the plastic molding is provided on a side surface adjacent to the at least one transfer surface, and
- wherein a pair of imperfect transfer portions are provided on the same side surface as the reference portion.

14. The plastic molding according to claim 13, wherein the pair of imperfect transfer portions has convex shapes.

15. The plastic molding according to claim 13, wherein the pair of imperfect transfer portions has concave shapes.

* * * * *